United States Patent
Agrawal

(10) Patent No.: US 7,749,598 B2
(45) Date of Patent: *Jul. 6, 2010

(54) FACER AND FACED POLYMERIC ROOFING BOARD

(75) Inventor: Gaurav Agrawal, Aurora, CO (US)

(73) Assignee: Johns Manville, Denver, CO (US)

( * ) Notice: Subject to any disclaimer, the term of this patent is extended or adjusted under 35 U.S.C. 154(b) by 1416 days.

This patent is subject to a terminal disclaimer.

(21) Appl. No.: 11/126,583

(22) Filed: May 11, 2005

(65) Prior Publication Data

US 2006/0275561 A1    Dec. 7, 2006

(51) Int. Cl.
B32B 3/26 (2006.01)

(52) U.S. Cl. .................. 428/305.5; 428/318.8; 428/198; 428/215

(58) Field of Classification Search .............. 428/318.4, 428/140, 306.6, 307.3, 318.8, 304.4, 317.9, 428/198, 215, 305.5; 52/404.1, 406.1, 406.2
See application file for complete search history.

(56) References Cited

U.S. PATENT DOCUMENTS

| | | | | |
|---|---|---|---|---|
| 3,512,819 | A * | 5/1970 | Gillingwater et al. | 52/461 |
| 4,351,873 | A * | 9/1982 | Davis | 428/198 |
| 4,388,366 | A * | 6/1983 | Rosato et al. | 442/374 |
| 4,438,166 | A * | 3/1984 | Gluck et al. | 428/113 |
| 5,112,678 | A | 5/1992 | Gay et al. | |
| 5,192,598 | A * | 3/1993 | Forte et al. | 428/71 |
| 5,192,607 | A * | 3/1993 | Soukup | 428/314.4 |
| 5,633,063 | A * | 5/1997 | Lause et al. | 428/71 |
| 5,695,870 | A * | 12/1997 | Kelch et al. | 428/318.4 |
| 5,698,304 | A * | 12/1997 | Brandon et al. | 428/215 |
| 5,735,092 | A * | 4/1998 | Clayton et al. | 52/309.9 |
| 5,891,563 | A * | 4/1999 | Letts | 428/318.4 |
| 6,093,481 | A * | 7/2000 | Lynn et al. | 428/217 |
| 6,358,599 | B1 * | 3/2002 | Deibel et al. | 428/308.4 |
| 6,368,991 | B1 | 4/2002 | Horner, Jr. et al. | |
| 6,858,550 | B2 | 2/2005 | Ahluwalla | |
| 6,872,673 | B2 * | 3/2005 | MacAulay | 442/152 |
| 6,875,308 | B2 * | 4/2005 | Kajander et al. | 162/135 |
| 7,049,251 | B2 * | 5/2006 | Porter | 442/79 |
| 7,476,427 | B2 * | 1/2009 | Ruid et al. | 428/35.7 |
| 2003/0134079 | A1 | 7/2003 | Bush et al. | |

* cited by examiner

*Primary Examiner*—Richard E Chilcot, Jr.
*Assistant Examiner*—Chi Q Nguyen
(74) *Attorney, Agent, or Firm*—Robert D. Touslee

(57) ABSTRACT

A prefabricated, faced roofing board composite includes a first board layer made of a polymeric material or a predominantly polymeric material and a fire and weather resistant fiberglass-based facer bonded to a top major surface of the first board layer and forming a top major surface of the composite. The fiberglass-based facer is substantially impervious to the passage of hot gases of combustion, water, and water vapor through the thickness of the fiberglass-based facer. The faced composite can be a cover board, an insulation board; can include cover board and insulation board layers; and can include cover board, insulation board, and baseboard layers. A second fiberglass-based facer that is substantially impervious to the passage of hot gases of combustion through its thickness can form a bottom major surface of the composite. The polymeric material or predominantly polymeric material of the board layer to which each fiberglass-based facer is bonded penetrates part of the way through, but not completely through, the fiberglass-based facer.

1 Claim, 5 Drawing Sheets

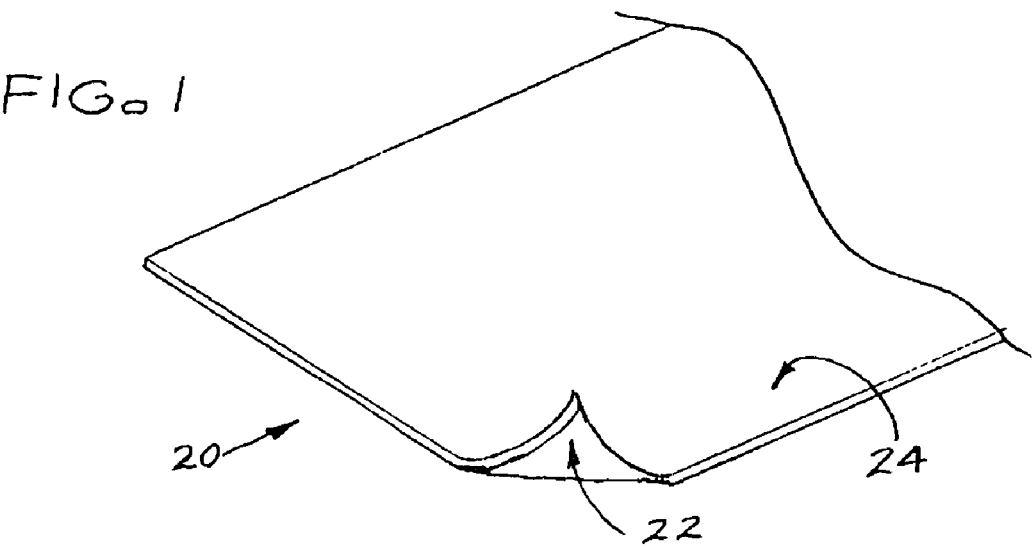
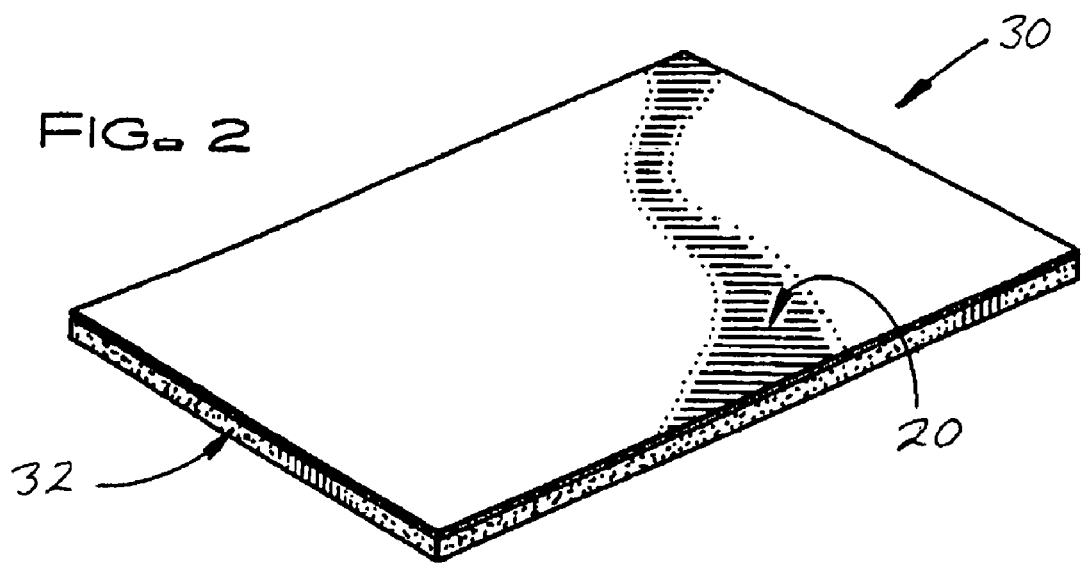

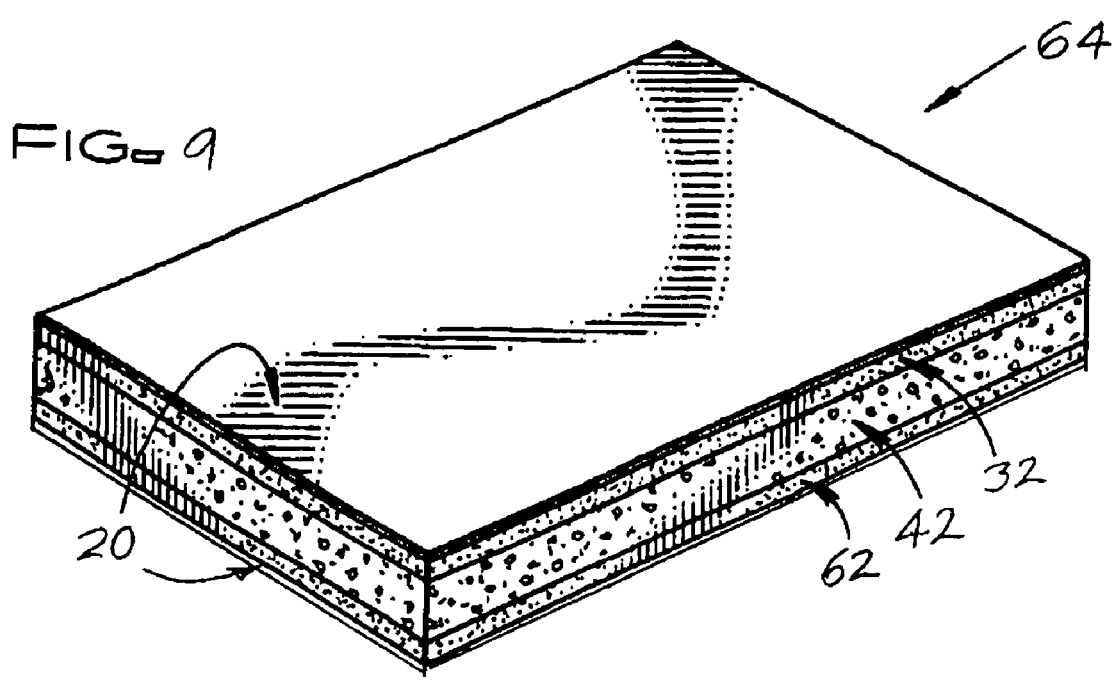

FACER AND FACED POLYMERIC ROOFING BOARD

BACKGROUND OF THE INVENTION

The subject invention relates to low-slope roofs that are typically found on commercial and industrial buildings, and in particular to an improved fire and moisture resistant fiberglass-based facer that is impervious or substantially impervious to the passage of hot gases of combustion, water, and water vapor through the thickness of the fiberglass-based facer and thereby to prefabricated faced roofing board composites for use on low-slope roofs that includes one or more polymeric or predominately polymeric board layers and are faced on at least one major surface with the fire and moisture resistant fiberglass-based facer of the subject invention.

Commercial and industrial buildings typically have roofs with low-slope roof decks. The roofing systems for these low-slope roofs typically include one or more layers of a low-density roofing insulation, a high-density layer of roofing cover boards that overlie the low-density roofing insulation layer(s), and a waterproofing membrane that overlies the layer of cover boards. If not protected, the layer(s) of low-density insulation, such as a low-density polymer-based foam insulation, can be partially crushed or otherwise damaged from worker traffic over the insulation, the placement of heavy objects on the insulation, the weather, and other causes commonly encountered in roofing construction. The layer of high-density roofing cover boards that overlies the one or more layers of low-density insulation, protects the more fragile low-density insulation from damage, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the high-density roofing cover boards, and the waterproofing membrane) of the roofing system are separately manufactured and separately and successively applied to the low-slope roof deck. While these roofing systems function very well, there has remained a need to provide an improved prefabricated faced roofing cover board composite, an improved prefabricated faced roofing insulation board composite, and an improved prefabricated faced roofing panel composite that includes at least an insulation board layer and a roofing cover board layer. With the use of such improved prefabricated roofing board composites, roofing systems for low-slope roof decks can be improved and/or the time, labor and costs associated with the installation of roofing systems on low-slope roof decks can be reduced.

SUMMARY OF THE INVENTION

The subject invention provides an improved fire and moisture resistant fiberglass-based facer and prefabricated faced roofing board composites that are faced with the improved fiberglass-based facer. The prefabricated faced roofing board composites of the subject invention that are faced with the improved fire and moisture resistant fiberglass-based facer of the subject invention include: an improved prefabricated faced polymeric or predominately polymeric roofing cover board composite, an improved prefabricated faced polymeric or predominately polymeric roofing insulation board composite, an improved prefabricated faced polymeric or predominately polymeric roofing panel composite that includes at least an insulation board layer and a roofing cover board layer; and an improved prefabricated faced polymeric or predominately polymeric roofing panel composite that includes at least two polymer or predominately polymeric material layers that differ from each other in density, composition, density and composition, or otherwise differ from each other in their physical and/or chemical characteristics. The prefabricated faced roofing board composites of the subject invention with the improved fire and moisture resistant fiberglass-based facer of the subject invention exhibit improved fire retardant properties and reduced flame spread characteristics.

The improved fire and moisture resistant fiberglass-based facer of the subject invention is substantially impervious to the passage of hot gases of combustion, water, and water vapor through the thickness of the fiberglass-based facer. Typically, the polymeric or predominately polymeric materials of polymeric roofing boards are not very fire resistant and the presence of normal blowing agents, such as pentane, within the polymeric or predominately polymeric foam materials of polymeric roofing boards further degrades the fire resistant properties of such roofing boards. It is believed that the nonporous nature of the fiberglass-based facer of the subject invention plus the fire retardant nature of the fiberglass mat or the fiberglass mat and mineral fillers of the fiberglass-based facer of the subject invention causes the fiberglass-based facer of the subject invention to function as both a fire barrier for the polymeric roofing board layer(s) of the roofing board composites of the subject invention and a thermal barrier that reduces the temperature of the underlying polymeric or predominately polymeric roofing board layer(s) of the roofing board composites of the subject invention. Thus, when compared with previous roofing board composites made of-polymeric or predominately polymeric materials and faced with either paper facers or permeable coated or uncoated facers, the roofing board composites of the subject invention are more fire resistant and exhibit improved fire retardant and flame spread characteristics.

Preferably, the fiberglass-based facers of the subject invention have a structure for permitting a limited penetration of a polymeric or predominately polymeric material liquid mixture through a first major surface of the fiberglass-based facer into, but only part of the way through, the fiberglass-based facer when the fiberglass-based facer overlies the polymeric or predominately polymeric material liquid mixture during the formation of a roofing board from the polymeric or predominately polymeric material liquid mixture. Thus, there is a strong bond between the fiberglass-based facer and the roofing board thus formed without permitting the polymeric or predominately polymeric material liquid mixture to pass through the fiberglass-based facer to a second major surface of the fiberglass facer where the polymeric or predominately polymeric material liquid mixture could adversely affect both the manufacturing process and the desired physical characteristics of the faced roofing board composite.

BRIEF DESCRIPTION OF THE DRAWINGS

FIG. 1 is a schematic perspective view of a fiberglass-based facer of the subject invention for improving the fire resistance and weathering properties of a polymeric roofing board.

FIG. 2 is a schematic perspective view of a prefabricated roofing panel composite of the subject invention that includes a high-density polymer or predominantly polymer material cover board with a fiberglass-based facer overlying the top major surface of the cover board.

FIG. 9 is a schematic perspective view of a prefabricated roofing panel composite of the subject invention that includes three polymeric or predominantly polymeric material layers wherein at least two of the layers differ from each other in density, composition, density and composition, or otherwise physically and/or chemically differ from each other (such as a high-density polymer or predominantly polymer material cover board, a low-density polymer or predominantly polymer material foam insulation board, and a high-density polymer or predominantly polymer material baseboard) with a fiberglass-based facer overlying the top major surface of the composite and a fiberglass-based or other facer overlying the bottom major surface of the composite.

DESCRIPTION OF THE PREFERRED EMBODIMENTS

Figure 3:
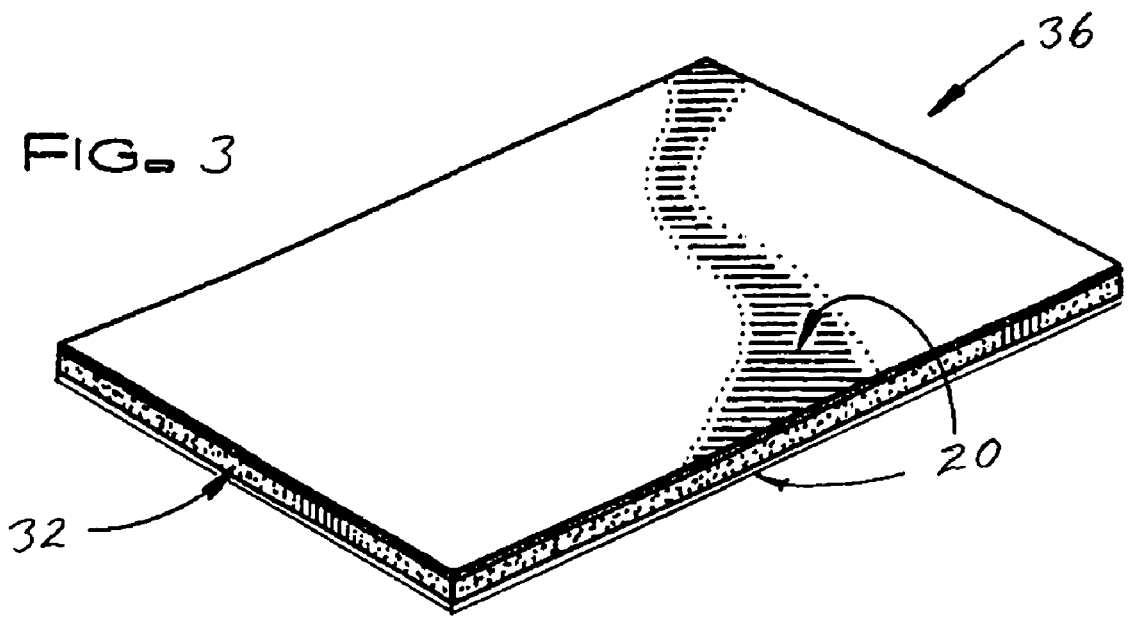
FIG. 3 is a schematic perspective view of a prefabricated roofing panel composite of the subject invention that includes a high-density polymer or predominantly polymer material cover board with a fiberglass-based facer overlying the top major surface of the cover board and a fiberglass-based or other facer overlying the bottom major surface of the cover board.

FIG. 1 shows a fiberglass-based facer 20 of the subject invention for improving the fire resistance and weathering properties of a roofing board. The fiberglass-based facer 20 may be: a) a woven or nonwoven uncoated fiberglass mat alone, b) an uncoated woven or nonwoven fiberglass mat with a polymeric binder, c) an uncoated woven or nonwoven fiberglass mat with a polymeric binder containing one or more mineral fillers, d) an uncoated woven or nonwoven fiberglass mat with one or more mineral fillers, e) a coated woven or nonwoven fiberglass mat that is coated with a coating containing one or more mineral fillers and a mineral filler carrier (e.g. an organic binder or emulsion) applied to a major surface of the facer that is to be the exposed major surface of the facer, or f) any of facers a to d with a coating containing one or more mineral filler(s) and a mineral filler carrier (e.g. an organic binder or emulsion) applied to a major surface of the facer that is to be the exposed major surface of the facer. The fire and weather resistant fiberglass-based facer 20 has a length, a width, and a thickness with first and second major surfaces 22 and 24 that are each defined by the length and the width of the fiberglass-based facer 20. The first major surface 22 of the fiberglass-based facer 20 is adapted to be bonded to a polymeric or predominately polymeric roofing board layer to form a roofing board composite incorporating the fiberglass-based facer 20 and the second major surface 24 of the fiberglass-based facer 20 is adapted to form an exposed surface of the roofing board composite.

The fiberglass-based facer 20 is substantially impervious to the passage of hot gases of combustion, water, and water vapor through the thickness of the fiberglass-based facer. In addition, the fiberglass-based facer 20 has a structure for permitting a limited penetration of a polymeric or predominately polymeric liquid mixture through the first major surface 22 of the fiberglass-based facer into, but only part of the way through, the fiberglass-based facer when the fiberglass-based facer overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20.

Where the fiberglass-based facer is formed by an uncoated fiberglass mat alone, the glass fibers and/or filaments of the mat are so entangled and/or closely spaced with respect to each other that fiberglass mat is substantially impervious to the passage of hot gases of combustion, water, and water vapor through the thickness of the fiberglass mat and thus the fiberglass-based facer 20. In preferred embodiments of the fiberglass-based facer 20, the fiberglass mat may progressively increase in density from the major surface of the fiberglass mat that forms the first major surface 22 of the fiberglass-based facer 20 to the major surface of the fiberglass mat that forms the second major surface 24 of the fiberglass-based facer 20; the fiberglass mat may have a higher density at and adjacent the major surface of the fiberglass mat that forms the second major surface 24 of the fiberglass-based facer 20 than throughout a remainder of the mat thickness; or the fiberglass mat may have a lower density at and adjacent the major surface of the fiberglass mat that forms the first major surface 22 of the fiberglass-based facer 20 than throughout a remainder of the mat thickness. These facer structures facilitate a limited penetration of a polymeric or predominately polymeric liquid mixture through the first major surface 22 of the fiberglass-based facer 20 into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20 where the polymeric or predominately polymeric liquid mixture could adversely affect the manufacturing process and/or the physical characteristics of the resulting faced roofing board composite.

Where the fiberglass-based facer 20 is formed by an uncoated fiberglass mat and a polymeric binder, a polymeric binder containing mineral filler(s), or mineral filler(s), the glass fibers and/or filaments of the mat are so entangled and/or closely spaced with respect to each other and the interstices of the fiberglass mat are so filled with the polymeric binder, the polymeric binder containing mineral filler(s), or the mineral fillers that the fiberglass mat with the polymeric binder, the polymeric binder containing mineral filler(s) or the mineral filler(s) is substantially impervious to the passage of hot gases of combustion, water, and water vapor through the thickness of the fiberglass mat and thus the fiberglass-based facer 20. In preferred embodiments of the fiberglass-based facer 20, the polymeric binder, the polymeric binder containing mineral filler(s) or the mineral filler(s) may be incorporated into the fiberglass mat at and adjacent the major surface of the fiberglass mat that forms the second major surface 24 of the fiberglass-based facer 20 rather than throughout the thickness of the fiberglass mat or the polymeric binder, the polymeric binder containing mineral filler(s) or the mineral filler(s) may be incorporated throughout the thickness of the mat except at and adjacent the major surface of the fiberglass mat that forms the first major surface 22 of the fiberglass-based facer 20. This facer structure facilitates the limited penetration of a polymeric or predominately polymeric liquid mixture through the first major surface 22 of the fiberglass-based facer into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20 where the polymeric or predominately polymeric liquid mixture could adversely affect the manufacturing process and/or the physical characteristics of the resulting faced roofing board composite. A mineral filler such as but not limited to calcium carbonate, mica, talc, and silica or blends of these mineral fillers may be used as the mineral filler(s) and the mineral fillers may be bonded to the fiberglass mat with inorganic adhesive materials. The polymeric binder, polymeric binder with mineral filler(s) or mineral filler(s) may be applied by any normal and established application technique.

Where the fiberglass-based facer 20 is formed by a fiberglass mat coated on a major surface with a coating containing mineral fillers and a mineral filler carrier, the glass fibers and/or filaments of the mat are so entangled and/or closely spaced with respect to each other and the interstices of the fiberglass mat are so filled with the mineral fillers and mineral filler carrier that the fiberglass mat with the mineral fillers and mineral filler carrier containing coating is substantially impervious to the passage of hot combustion gases, water, and water vapor through the thickness of the fiberglass mat and thus the fiberglass-based facer 20. In preferred embodiments of the fiberglass-based facer 20, the mineral filler(s) and mineral filler carrier of the coating may be incorporated into the fiberglass mat at and adjacent the major surface of the fiberglass mat that forms the second major surface 24 of the fiberglass-based facer 20 rather than throughout the thickness of the fiberglass mat or the mineral filler(s) and mineral filler carrier of the coating may be incorporated throughout the thickness of the mat except at and adjacent the major surface of the fiberglass mat that forms the first major surface 22 of the fiberglass-based facer 20. This facer structure facilitates the limited penetration of a polymeric or predominately polymeric liquid mixture through the first major surface 22 of the fiberglass-based facer into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20 where the polymeric or predominately polymeric liquid mixture could adversely affect the manufacturing process and/or the physical characteristics of the resulting faced roofing board composite. A mineral filler such as but not limited to calcium carbonate, mica, talc, and silica or blends of these mineral fillers may be used as the mineral filler(s) and these filler(s) may be bonded to the fiberglass mat with inorganic adhesive materials that form or are included in the mineral filler carrier. The mineral filler carrier may be formulated to enhance the performance of the fiberglass-based facer 20 and may include a fire retardant to further mitigate flammability and smoke generation and/or other additives, such as but not limited to rheology modifiers and additives that enhance the UV resistance and/or other weathering characteristics of the facer. The coating may be applied by any normal and established application technique, such as but not limited to drawdown coating, spray coating, roll coating, knife over roll coating, etc.

The fiberglass-based facer 20 may be applied to various single or multi-layer roofing boards to form faced roofing board composites that are more fire and weather resistant. For example, a fiberglass-based facer 20 can be applied to one major surface or fiberglass-based facers 20 can be applied to both major surfaces of roofing cover boards; a fiberglass-based facer 20 can be applied to one major surface or fiberglass-based facers 20 can be applied to both major surfaces of roofing insulation boards; a fiberglass-based facer 20 can be applied to one major surface or fiberglass-based facers 20 can be applied to both major surfaces of high density and low density polymeric or predominately polymeric material roofing board composites e.g. cover board and insulation board composites and cover board, insulation board, and baseboard composites; and a fiberglass-based facer 20 can be applied to one major surface or fiberglass-based facers 20 can be applied to both major surfaces of multi-layer polymeric or predominately polymeric material roofing board composites where at least two of the polymeric or predominately polymeric material layers of the composite differ from each other e.g. have densities, compositions, or densities and compositions that differ from each other. In addition, where a fiberglass-based facer 20 is applied to one major surface of a single or multi-layer roofing board to form a faced roofing board composite that is more fire and weather resistant, the other major surface of the roofing board may be overlaid with a different type of facer, e.g. a non-fiberglass-based facer or a facer having different physical characteristics or properties.

FIG. 2 is a schematic perspective view of a prefabricated roofing board composite 30 of the subject invention. The prefabricated roofing board composite 30 is a roofing cover board composite with a high-density polymer or predominantly polymer material or foam material core layer 32 and a fiberglass-based facer 20 overlying and bonded to the top major surface of the high-density polymer or predominantly polymer material or foam material core layer 32. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing cover board composites.

Preferably, the high-density polymer or predominantly polymer material or foam material core layer 32 of the roofing cover board composite 30 has a density or an average density between 6 lbs/ft$^3$ and 25 lbs/ft$^3$ and more preferably a density or an average density of at least 8 lbs/ft$^3$. Typically, the high-density polymer or predominantly polymer material or foam core layer 32 of the roofing cover board composite 30 has a width of about four feet or greater and a length of about four feet or greater, preferably, about eight feet or greater, and could have lengths that are limited only by the ability to store, transport, and handle the roofing cover board composite 30 prior to installation. Preferably, the high-density polymer or predominantly polymer material or foam material core layer 32 of the roofing cover board composite 30 has a thickness of about 0.08 inches or greater and more preferably a thickness between about 0.08 inches and about 0.75 inches. The density and thickness of the high-density polymer or predominantly polymer material or foam material core layer 32 of the roofing cover board composite 30 are selected to provide the roofing cover board composite 30 with the compressive strength to resist deformation and protect low-density insulation layers overlaid by the roofing cover board composite from damage. For example, the polymer or predominantly polymer material core layer 32 may vary in density throughout the thickness of the core layer with the core layer progressively increasing in density from its bottom major surface to its top major surface.

The high-density polymer or predominantly polymer material or foam material core layer 32 of the roofing cover board composite 30 may be made of various high-density polymer or predominantly polymer materials [e.g. a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with inorganic filler(s) or a high-density material made of a blend of these materials with filler(s); a high-density predominantly polyisocyanurate, polyurethane, polystyrene, or phenolic foam material with inorganic filler(s) or a high-density foam material made of a blend of these materials with filler(s), a high-density material made of other thermoset matrix polymers; etc.]. However, a preferred material for the high-density core layer 32 is a high-density polyisocyanurate or predominantly polyisocyanurate material or foam material. The predominantly polymer materials of the high-density core layer 32 may contain various powdered and liquid fillers, fiber reinforcements, fungi growth-inhibiting agents, and fire-retardants to reduce the cost of and/or modify the properties of the high-density core layer 32, such as but not limited to the compressive strength, the toughness, the flexibility, the friability, and the fire resistance of the core layer. Examples of fillers that may be used in the high-density predominantly polymer material core layer 32 are fillers such as limestone ($CaCO_3$), fiberglass, recycled polyisocyanurate dust, and extenders/plasticizers.

FIG. 3 is a schematic perspective view of a prefabricated roofing board composite 36 of the subject invention. The prefabricated roofing board composite 36 is a roofing cover board composite with a high-density polymer or predominantly polymer material or foam material core layer 32 and fiberglass-based facers 20 overlying and bonded to each major surface of the high-density polymer or predominantly polymer material or foam material core layer 32. Either or both of the fiberglass-based facers 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing cover board composites. Other than having fiberglass-based facers 20 that overlie and are bonded to both major surfaces of the high-density polymer or predominantly polymer material or foam material core layer 32, the roofing cover board composite 36 is the same as the roofing cover board composite 30.

Figure 4:
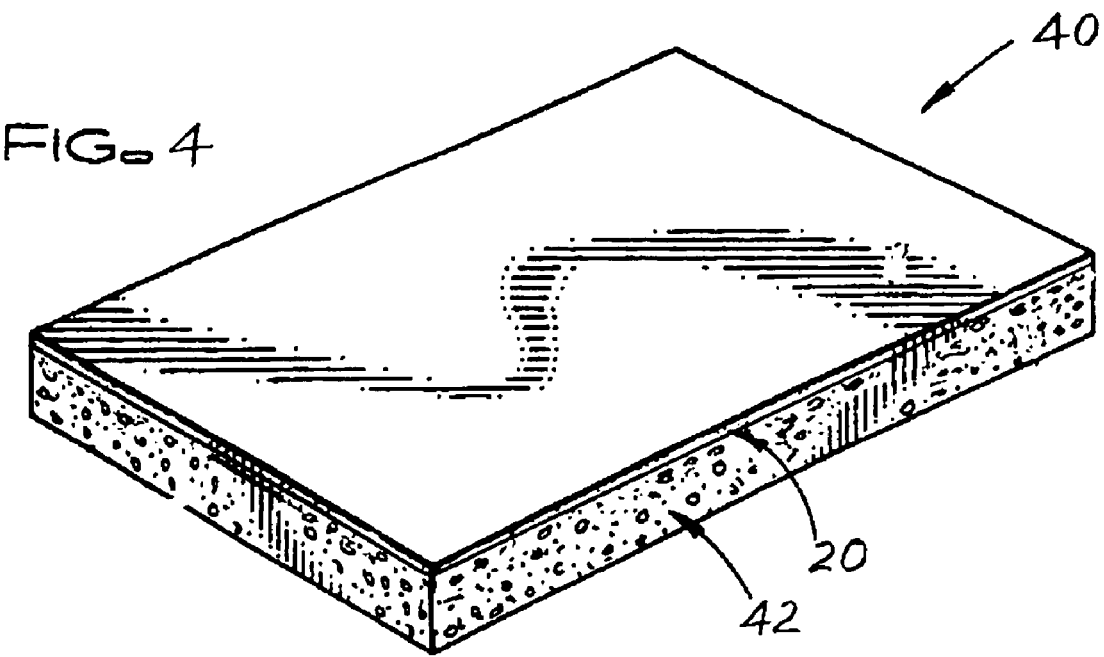
FIG. 4 is a schematic perspective view of a prefabricated roofing panel composite of the subject invention that includes a low-density polymer or predominantly polymer material foam insulation board with a fiberglass-based facer overlying the top major surface of the insulation board.

FIG. 4 is a schematic perspective view of a prefabricated roofing board composite 40 of the subject invention. The prefabricated roofing board composite 40 is a roofing insulation board composite with a low-density polymer or predominantly polymer material foam core layer 42 and a fiberglass-based facer 20 that overlies and is bonded to the top major surface of the low-density polymer or predominantly polymer material foam core layer 42. The fiberglass-based facer 20 may be substantially coextensive with, coextensive with, or extend beyond the major surface of the core layer 42 to which the fiberglass-based facer 20 is bonded along the length (s) of any one, two, or three edges of the core layer 42 or along the lengths of all four edges of the core layer 42 to overlap and be bonded to other roofing insulation board composites 40.

Preferably, the low-density polymer or predominantly polymer material foam core layer 42 of the roofing insulation board composite 40 has a density or an average density of less than 6 lbs/$^3$, preferably less than 4 lbs/ft$^3$, and typically a density or an average density between about 1 lbs/ft$^3$ and about 3 lbs/ft$^3$. Typically, the low-density polymer or predominantly polymer material foam core layer 42 of the roofing insulation board composite 40 has a width of about four feet or greater and a length of about four feet or greater, preferably, about eight feet or greater, and could have lengths that are limited only by the ability to store, transport, and handle the roofing insulation board composite 40 prior to installation. Preferably, the low-density polymer or predominantly polymer material foam core layer 42 of the roofing insulation board composite 40 has a thickness of about 0.50 inches or greater and more preferably a thickness between about 0.50 inches and about 6 inches. The density and thickness of the low-density polymer or predominantly polymer material foam core layer 42 of the roofing insulation board composite 40 are selected to provide the roofing insulation board composite 40 with the desired insulating properties for the roofing system application. For example, the polymer or predominantly polymer material core layer 42 may vary in density throughout the thickness of the core layer with the core layer progressively increasing in density from its bottom major surface to its top major surface.

The low-density polymer or predominantly polymer material foam core layer 42 of the roofing insulation board 40 may be made of various low-density polymer or predominantly polymer foam materials [e.g. a low-density polyisocyanurate, polyurethane, polystyrene, or phenolic foam material or a low-density foam material made of a blend of these materials; a low-density predominantly polyisocyanurate, polyurethane, polystyrene, or phenolic foam material with inorganic filler(s) or a low-density foam material made of a blend of these materials with filler(s), a low-density foam material made of other thermoset matrix polymers; etc.]. However, a preferred material for the low-density core layer 42 is a low-density polyisocyanurate or predominantly polyisocyanurate foam material.

Figure 5:
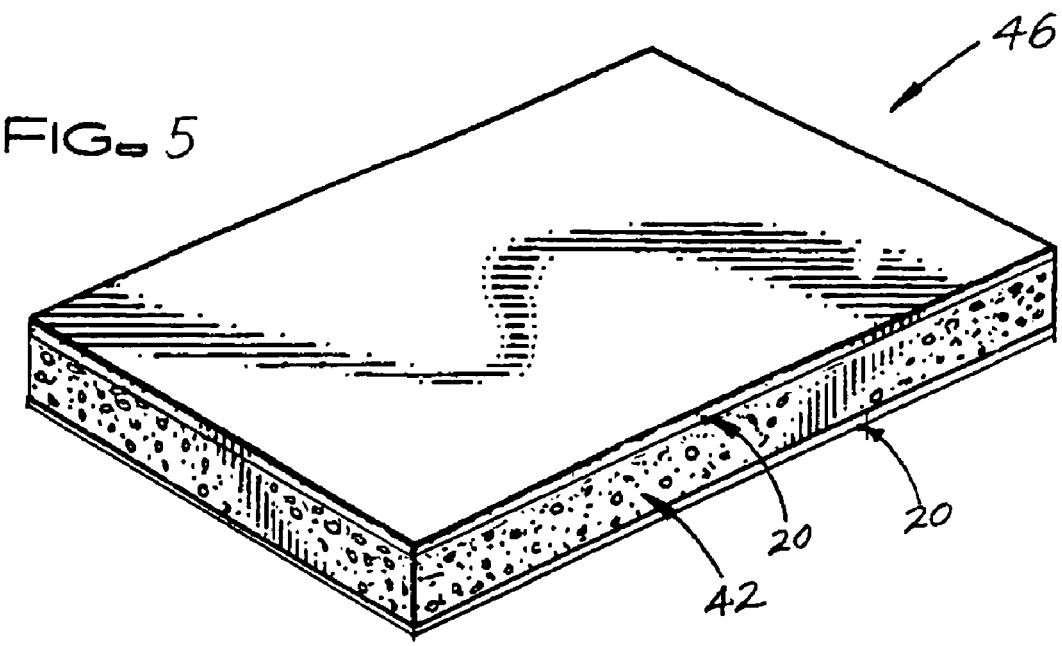
FIG. 5 is a schematic perspective view of a prefabricated roofing panel composite of the subject invention that includes a low-density polymer or predominantly polymer material foam insulation board with a fiberglass-based facer overlying the top major surface of the insulation board and a fiberglass-based or other facer overlying the bottom major surface of the insulation board.

FIG. 5 is a schematic perspective view of a prefabricated roofing board composite 46 of the subject invention. The prefabricated roofing board composite 46 is a roofing insulation board composite with a low-density polymer or predominantly polymer material foam core layer 42 and fiberglass-based facers 20 overlying and bonded to each major surface of the low-density polymer or predominantly polymer material foam core layer 42. Either or both of the fiberglass-based facers 20 may be substantially coextensive with, coextensive with, or extend beyond the major surface of the core layer 42 to which the fiberglass-based facer 20 is bonded along the length(s) of any one, two, or three edges of the core layer 42 or along the lengths of all four edges of the core layer 42 to overlap and be bonded to other roofing insulation board composites. Other than having fiberglass-based facers 20 that overlie and are bonded to both major surfaces of the low-density polymer or predominantly polymer material foam core layer 42, the roofing insulation board composite 46 is the same as the roofing insulation board composite 40.

Figure 6:
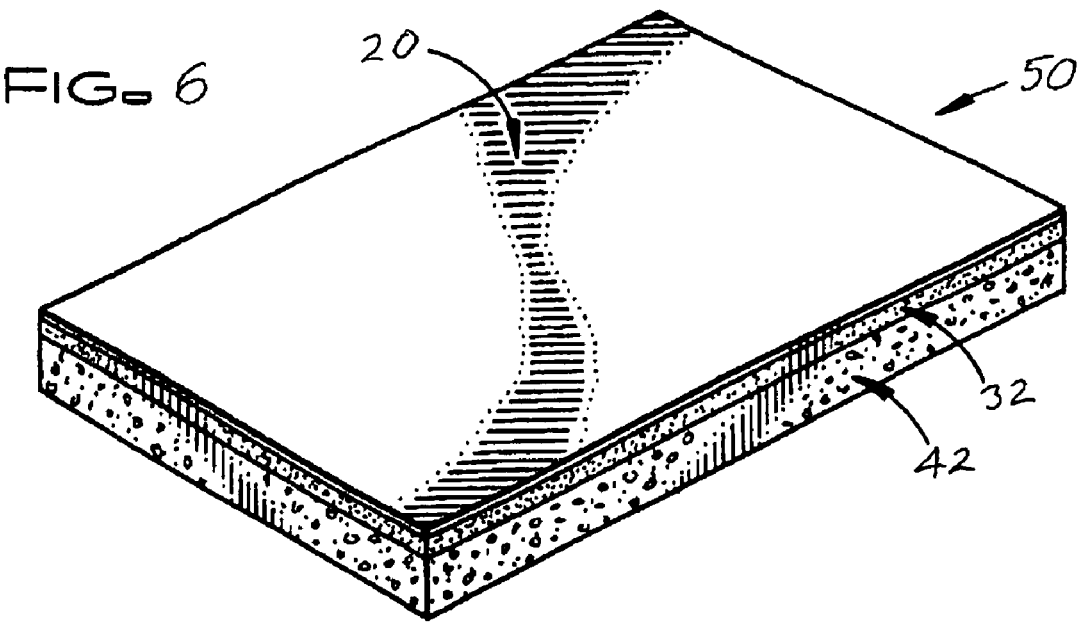
FIG. 6 is a schematic perspective view of a prefabricated roofing panel composite of the subject invention that includes two polymeric or predominantly polymeric material layers that differ from each other in density, composition, density and composition, or otherwise physically and/or chemically differ from each other (such as a high-density polymer or predominantly polymer material cover board and a low-density polymer or predominantly polymer material foam insulation board) with a fiberglass-based facer overlying the top major surface of the roofing panel composite.

FIG. 6 is a schematic perspective view of a prefabricated roofing panel composite 50 of the subject invention. The prefabricated roofing panel composite 50 includes a high-density polymer or predominantly polymer material or foam material core layer 32, a low-density polymer or predominantly polymer material foam core layer 42 that are bonded together, and fiberglass-based facer 20 that overlies and is bonded to a top major surface of the core layer 32. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing panel composites. The prefabricated roofing panel composite 50 typically has a width of about four feet or greater and a length of about four feet or greater, preferably, about eight feet or greater and could have lengths that are limited only by the ability to store, transport and handle the roofing panel composites prior to installation.

Preferably, the high-density polymer or predominantly polymer material or foam material core layer 32 of the roofing panel composite 50 has a density or an average between 6 lbs/ft$^3$ and 25 lbs/ft$^3$ and more preferably a density or average density of at least 8 lbs/ft$^3$. Preferably, the high-density polymer or predominantly polymer material or foam material core layer 32 of the roofing panel composite 50 has a thickness of about 0.08 inches or greater and more preferably a thickness between about 0.08 inches and about 0.75 inches. The density and thickness of the high-density polymer or predominantly polymer material or foam material core layer 32 of the roofing panel composite 30 are selected to provide the roofing core layer 32 with the compressive strength to resist deformation and protect low-density insulation core layer 42 of the composite that is overlaid by the core layer 32. The high-density polymer or predominantly polymer material or foam material core layer 32 of the roofing panel composite 50 may be made of the same high-density polymer or predominantly polymer materials as the core layer 32 of the roofing cover board composite 30.

Preferably, the low-density polymer or predominantly polymer material foam core layer 42 of the roofing panel composite 50 has a density or average density of less than 6 lbs/ft$^3$, preferably less than 4 lbs/ft$^3$, and typically a density or an average density between about 1 lbs/ft$^3$ and about 3 lbs/ft$^3$. Preferably, the low-density polymer or predominantly polymer material foam core layer 42 of the roofing panel composite 50 has a thickness of about 0.50 inches or greater and more preferably a thickness between about 0.50 inches and about 6 inches. The density and thickness of the low-density polymer or predominantly polymer material foam core layer 42 of the roofing panel composite 50 are selected to provide the roofing panel composite 50 with the desired insulating properties for the roofing system application. The low-density polymer or predominantly polymer material core layer 42 of the roofing panel composite 50 may be made of the same low-density polymer or predominantly polymer materials as the core layer 42 of the roofing insulation board composite 40.

Figure 7:
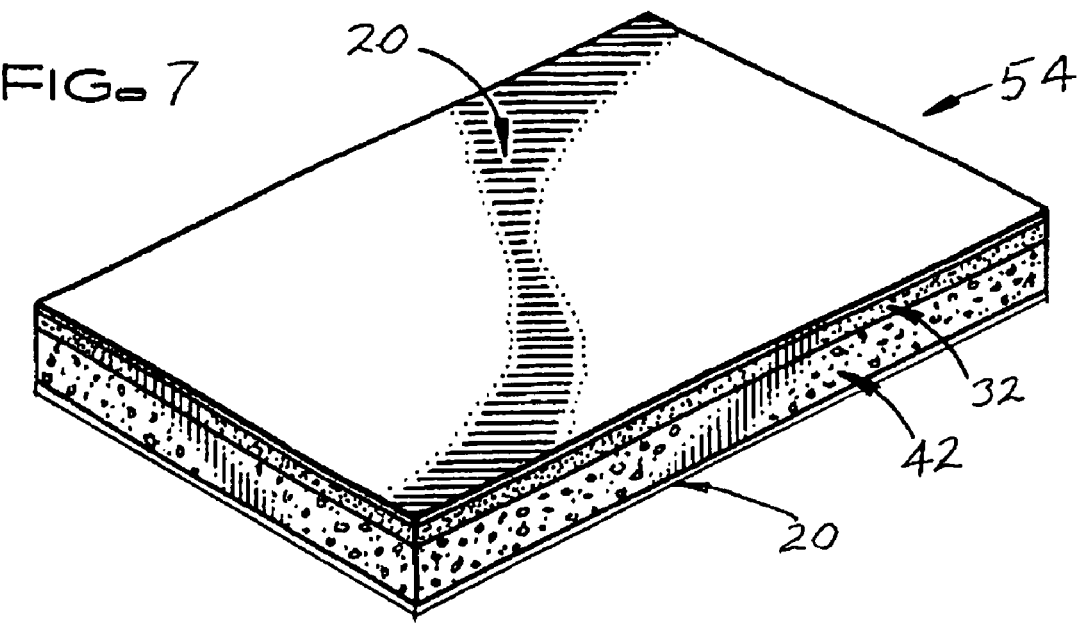
FIG. 7 is a schematic perspective view of a prefabricated roofing panel composite of the subject invention that includes two polymeric or predominantly polymeric material layers that differ from each other in density, composition, density and composition, or otherwise physically and/or chemically differ from each other (such as a high-density polymer or predominantly polymer material cover board and a low-density polymer or predominantly polymer material foam insulation board) with a fiberglass-based facer overlying the top major surface of the roofing panel composite and a fiberglass-based or other facer overlying the bottom major surface of the roofing panel composite.

FIG. 7 is a schematic perspective view of a prefabricated roofing board composite 54 of the subject invention. The prefabricated roofing panel composite 54 includes a high-density polymer or predominantly polymer material or foam material core layer 32, a low-density polymer or predominantly polymer material foam core layer 42 that are bonded together, a fiberglass-based facer 20 that overlies and is bonded to a top major surface of the core layer 32, and a fiberglass-based facer 20 that overlies and is bonded to a bottom major surface of the core layer 42. The fiberglass-based facers 20 may be substantially coextensive with, coextensive with, or extend beyond the major surface of the core layer 32 or 42 to which the fiberglass-based facer 20 is bonded along the length(s) of any one, two, or three edges of the core layer or along the lengths of all four edges of the core layer to overlap and be bonded to other roofing panel composites. Other than having fiberglass-based facers 20 that overlie and are bonded to both the top major surface of the core layer 32 and the bottom major surface of the core layer 42 instead of just the top major surface of the core layer 32, the roofing panel composite 54 is the same as the roofing insulation board composite 50.

Figure 8:
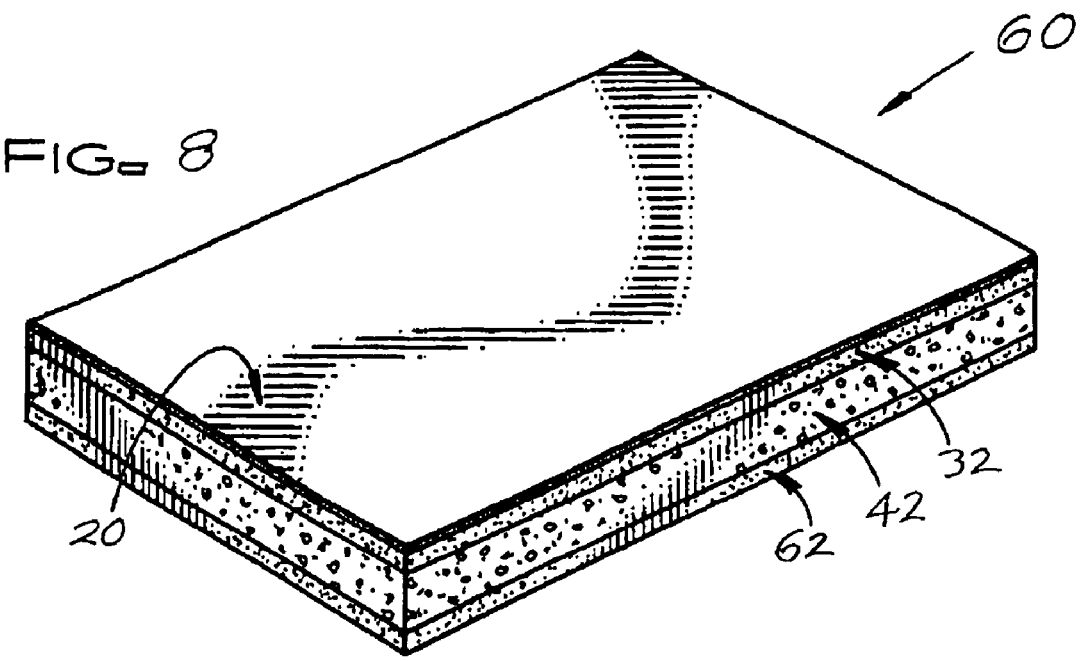
FIG. 8 is a schematic perspective view of a prefabricated roofing panel composite of the subject invention that includes three polymeric or predominantly polymeric material layers wherein at least two of the layers differ from each other in density, composition, density and composition, or otherwise physically and/or chemically differ from each other (such as a high-density polymer or predominantly polymer material cover board, a low-density polymer or predominantly polymer material foam insulation board, and a high-density polymer or predominantly polymer material baseboard) with a fiberglass-based facer overlying the top major surface of the roofing panel composite.

FIG. 8 is a schematic perspective view of a prefabricated roofing panel composite 60 of the subject invention. The prefabricated roofing panel composite 60 includes: a high-density polymer or predominantly polymer material or foam material core layer 32 that forms a cover board layer of the composite, a low-density polymer or predominantly polymer material foam core layer 42 that forms an insulation board layer of the composite, a high-density polymer or predominantly polymer material or foam material layer 62 that forms a baseboard layer of the composite, and a fiberglass-based facer 20 that overlies and is bonded to the top major surface of the core layer 32. The core layer 42 is intermediate and bonded to both the core layer 32 and the core layer 62. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing panel composites. The prefabricated roofing panel composite 60 typically has a width of about four feet or greater and a length of about four feet or greater, preferably, about eight feet or greater and could have lengths that are limited only by the ability to store, transport and handle the roofing panel composite prior to installation.

Preferably, the high-density polymer or predominantly polymer material or foam material core layers 32 and 62 of the roofing panel composite 60 have a density or an average density between 6 lbs/ft$^3$ and 25 lbs/ft$^3$ and more preferably a density or an average density of at least 8 lbs/ft$^3$. Preferably, the high-density polymer or predominantly polymer material or foam material core layers 32 and 62 of the roofing panel composite 60 has a thickness of about 0.08 inches or greater and more preferably a thickness between about 0.08 inches and about 0.75 inches. The density and thickness of the high-density polymer or predominantly polymer material or foam material core layers 32 and 62 of the roofing panel composite 60 are selected to provide the core layers 32 and 62 with the compressive strength to resist deformation and protect low-density insulation core layer 42 of the composite that located between the core layers 32 and 42. The high-density polymer or predominantly polymer material or foam material core layers 32 and 62 of the roofing panel composite 60 may be made of the same high-density polymer or predominantly polymer materials as the core layer 32 of the roofing cover board composite 30. The high-density polymer or predominantly polymer material or foam material core layers 32 and 62 of the roofing panel composite 60 may have the same or different densities.

Preferably, the low-density polymer or predominantly polymer material foam core layer 42 of the roofing panel composite 60 has a density or an average density of less than 6 lbs/ft$^3$, preferably less than 4 lbs/ft$^3$, and typically a density or an average density between about 1 lbs/ft$^3$ and about 3 lbs/ft$^3$. Preferably, the low-density polymer or predominantly polymer material foam core layer 42 of the roofing panel composite 60 has a thickness of about 0.50 inches or greater and more preferably a thickness between about 0.50 inches and about 6 inches. The density and thickness of the low-density polymer or predominantly polymer material foam core layer 42 of the roofing panel composite 60 are selected to provide the roofing panel composite 60 with the desired insulating properties for the roofing system application. The low-density polymer or predominantly polymer material foam core layer 42 of the roofing panel composite 60 may be made of the same low-density polymer or predominantly polymer materials as the core layer 42 of the roofing insulation board composite 40.

FIG. 9 is a schematic perspective view of a prefabricated roofing board composite 64 of the subject invention. The prefabricated roofing panel composite 64 includes: a high-density polymer or predominantly polymer material or foam material core layer 32 that forms a cover board layer of the composite, a low-density polymer or predominantly polymer material foam core layer 42 that forms an insulation board layer of the composite, a high-density polymer or predominantly polymer material or foam material core layer 62 that forms a baseboard layer of the composite, a fiberglass-based facer 20 that overlies and is bonded to the top major surface of the core layer 32, and a fiberglass-based facer 20 that overlies and is bonded to the bottom major surface of the core layer 62. The core layer 42 is intermediate and bonded to both the core layer 32 and the core layer 62. The fiberglass-based facers 20 may be substantially coextensive with, coextensive with, or extend beyond the major surfaces of the core layer 32 or 62 to which the fiberglass-based facer 20 is bonded along the length (s) of any one, two, or three edges of the core layer or along the lengths of all four edges of the core layer to overlap and be bonded to other roofing panel composites. Other than having fiberglass-based facers 20 that overlie and are bonded to both the top major surface of the core layer 32 and the bottom major surface of the core layer 62 instead of just the top major surface of the core layer 32, the roofing panel composite 64 is the same as the roofing insulation board composite 60.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, any of the fiberglass-based facers 20 of the subject invention may be used as a facer or facers for a roofing panel composite wherein there is only one polymeric or predominantly polymeric material layer that progressively increases in density from its bottom major surface to its top major surface and has an average density between about 1.2 and about 25 lbs/ft$^3$ e.g. a prefabricated faced roofing panel composite wherein the polymeric or predominantly polymeric material layer forms a combined cover and insulation board of the faced roofing panel composite. Thus, the invention is not intended to be limited to the specific embodiments disclosed, but is to be limited only by the claims appended hereto.

What is claimed is:

1. A prefabricated, faced roofing board composite comprising:
    a first fiberglass-based facer that is fire and weather resistant; a second fiberglass-based facer that is fire resistant; a cover board layer made of a high-density polyisocyanurate or predominately polyisocyanurate material; and an insulation board layer made of a low-density polyisocyanurate or predominately polyisocyanurate foam material;
    the cover board layer having a length and width; the cover board layer having an average density between about 6 lbs/ft$^3$ and about 25 lbs/ft$^3$ and a thickness of at least 0.08 inches; the cover board layer having a top major surface and a bottom major surface that are each defined by the length and the width of the cover board layer;
    the first fiberglass-based facer comprising a fiberglass mat and having a length, a width, and a thickness; the first fiberglass-based facer having a topside major surface and an underside major surface that are each defined by the length and the width of the first fiberglass-based facer; the first fiberglass-based facer being substantially impervious to the passage of hot gases of combustion and water vapor through the thickness of the first fiberglass-based facer;
    the first fiberglass-based facer being substantially coextensive with the top major surface of the cover board layer with the underside major surface of the first fiberglass-based facer being in contact with the top major surface of the cover board layer; and the high density polyisocyanurate or predominately polyisocyanurate material of the cover board layer penetrating through the underside major surface of the first fiberglass-based facer part of the way through, but not completely through, the first fiberglass-based facer to effect a strong bond between the first fiberglass-based facer and the top major surface of the cover board layer while the topside major surface of the first fiberglass-based facer, which forms a top exposed surface of the composite, is free of the high-density polyisocyanurate or predominately polyisocyanurate material of the cover board layer;

the insulation board layer having a length and width and a top major surface and a bottom major surface that are each defined by the length and the width of the insulation board layer; the top major surface of the insulation board layer being substantially coextensive with and bonded to the bottom major surface of the cover board layer; and the insulation board layer having an average density less than 4 lbs/ft$^3$ and a thickness of at least 0.50 inches;

the second fiberglass-based facer having a length, a width, and a thickness; the second fiberglass-based facer having a topside major surface and an underside major surface that are each defined by the length and the width of the second fiberglass-based facer; the second fiberglass-based facer being substantially impervious to the passage of hot gases of combustion through the thickness of the second fiberglass-based facer; and the second fiberglass-based facer being substantially coextensive with and bonded to the bottom major surface of the insulation board layer with the topside major surface of the second fiberglass-based facer being in contact with the bottom major surface of the insulation board layer; and the low density polyisocyanurate or predominately polyisocyanurate foam material of the insulation board layer penetrating through the topside major surface of the second fiberglass-based facer part of the way through, but not completely through, the second fiberglass-based facer to effect a strong bond between the second fiberglass-based facer and the bottom major surface of the insulation board layer while the underside major surface of the second fiberglass-based facer is free of the low-density polyisocyanurate or predominately polyisocyanurate foam material of the insulation board layer.

\* \* \* \* \*